(12) United States Patent
Grant (10) Patent No.: US 7,026,377 B1
(45) Date of Patent: Apr. 11, 2006

(54) HIGH PERFORMANCE FIBER REINFORCED THERMOPLASTIC RESIN, METHOD AND APPARATUS FOR MAKING THE SAME

(75) Inventor: Frank Grant, Sterling Heights, MI (US)

(73) Assignee: Mayco Plastics, Sterling Heights, MI (US)

( * ) Notice: Subject to any disclaimer, the term of this patent is extended or adjusted under 35 U.S.C. 154(b) by 605 days.

(21) Appl. No.: 09/943,784

(22) Filed: Aug. 31, 2001

(51) Int. Cl.
*C08J 3/00* (2006.01)
*C08K 9/00* (2006.01)
*C08K 9/06* (2006.01)
*C08L 75/00* (2006.01)
*B62D 27/00* (2006.01)

(52) U.S. Cl. .......... 523/200; 296/38; 280/727; 264/331.15; 264/328.1; 264/331.17; 264/239; 264/500; 264/520; 264/521; 264/523; 264/528; 523/205; 523/206; 523/214; 523/217

(58) Field of Classification Search .......... 523/200, 523/205, 206, 214, 217; 264/500, 520, 521, 264/523, 528, 239, 328.1, 331.15, 331.17; 280/727; 296/38
See application file for complete search history.

(56) References Cited

U.S. PATENT DOCUMENTS

| | | | |
|---|---|---|---|
| 3,632,254 A | 1/1972 | Woodham et al. | 425/205 |
| 4,001,368 A | 1/1977 | Michizoe et al. | 264/176 |
| 4,331,735 A | 5/1982 | Shanoski | 428/423 |
| 4,762,884 A | 8/1988 | Goyert et al. | 525/28 |
| 4,897,233 A | 1/1990 | Bier et al. | 264/108 |
| 4,927,579 A | 5/1990 | Moore | 264/101 |
| 4,937,028 A | 6/1990 | Clemet et al. | 264/136 |
| 5,026,512 A | 6/1991 | Chang | 264/40.6 |
| 5,106,564 A | 4/1992 | Iwanami et al. | 264/211.23 |
| 5,173,230 A | 12/1992 | Colombo | 264/102 |
| 5,264,174 A | 11/1993 | Takei et al. | 264/211.23 |
| 5,264,261 A | 11/1993 | Bush | 428/36.4 |
| 5,358,680 A | 10/1994 | Boissonnat et al. | 264/177 |
| 5,476,628 A | 12/1995 | Baumgartl et al. | 264/210 |
| 5,500,170 A | 3/1996 | Okumura et al. | 264/148 |
| 5,569,713 A | 10/1996 | Lieberman | 525/146 |
| 5,595,696 A | 1/1997 | Schlarb et al. | 264/118 |
| 5,626,643 A | 5/1997 | Woodside et al. | 65/442 |
| 5,643,989 A | 7/1997 | Van De Grampel et al. | 524/494 |
| 5,656,675 A | 8/1997 | Kobayashi et al. | 521/79 |
| 5,688,877 A | 11/1997 | Koenig et al. | 525/526 |
| 5,851,468 A | 12/1998 | Kaiser | 264/177.13 |
| 5,876,647 A | 3/1999 | Makise et al. | 264/105 |
| 5,939,001 A | 8/1999 | Heber et al. | 264/211 |
| 6,060,010 A | 5/2000 | Sakai et al. | 264/211.21 |
| 6,099,910 A | 8/2000 | Woodside | 427/386 |
| 6,159,408 A | 12/2000 | Kitayama et al. | 264/240 |
| 6,211,280 B1 | 4/2001 | Schell | 524/494 |

*Primary Examiner*—Patrick D. Niland
(74) *Attorney, Agent, or Firm*—Young & Basile, P.C.

(57) ABSTRACT

A process for producing a fiber-reinforced molded article and the resulting article such as a cantilevered battery tray. In the process, thermoplastic material in its solid state having a melt flow index above 25 g/10 minutes is fed into a suitable processing machine simultaneous with the addition of reinforcing fibers having a length of at least 0.375 inch or greater and sized with a material such as polyurethane, polyurea, and isocyanate derivatives thereof. The introduced materials are subjected to orientational agitation such that the reinforcing fibers are filamentized in an essentially homogeneous dispersion throughout the solid polymeric material. Once filamentization and dispersion are achieved, the resulting admixture is subjected to knead melting operations for an interval sufficient to achieve melting of the polymeric material introduced into a suitable plasticizing apparatus where the introduced material can be subjected to suitable knead melting operations. The melt kneading operations proceed at a compression ratio between 2.0:1 and 2.9:1. Material so produced is introduced into a suitable closed cavity mold. The resulting molded part has a tensile strength at break at least 20,000 psi and preferably has at least one cantilever. Examples of such parts include cantilevered battery trays. Such trays can have an ABS mounting bracket advantageously associated therewith.

41 Claims, 3 Drawing Sheets

HIGH PERFORMANCE FIBER REINFORCED THERMOPLASTIC RESIN, METHOD AND APPARATUS FOR MAKING THE SAME

FIELD OF THE INVENTION

This invention relates to fiber reinforced thermoplastic resins and processes for compounding such resins and molding parts therefrom More particularly, the present invention pertains to reinforced polyolefin resins reinforced with atypical length glass fibers having unusual performance characteristics such as tensile strength as well as an apparatus for preparing the same. The present invention also pertains to a formulation process whereby reinforcement fibers of atypical length are integrated into a thermoplastic polymeric matrix in a process which includes formulation of the reinforced matrix and direct introduction of the procured reinforced material into a suitable mold device.

BRIEF DESCRIPTION OF THE RELEVANT ART

In recent years polyolefins such as polypropylene has gained increasing popularity as thermoplastic molding materials for making a great variety of molded objects. Because polyolefins such as polypropylene offers a unique combination of low density, abrasion resistance, good chemical resistance, relatively high softening point and low cost, these polymers are good candidates for use as fiber reinforced thermoplastic compositions. Reinforcement by fibers such as glass and the like offer compositions with better stiffness, impact resistance and heat resistance than their unreinforced counterparts. Thus, reinforced polyolefins such as polypropylene continue to gain acceptance for use in various industry parts such as automobile parts and electrical parts.

Fiber reinforcement of various polymers has presented certain technical difficulties. Among these is the challenge of integrating the long reinforcing fiber into the polymer matrix in a uniform manner which assures optimum bonding between matrix and reinforcing fiber. Many processes which have been proposed yield material in which the reinforcing material is unevenly distributed and/or prone to matting, clumping, fiber length reduction or other undesirable orientations.

It is generally accepted that the tensile strength of the resulting polymeric part is determined, at least in part, by the average and distribution length of reinforcing fibers present in the polymeric matrix Unfortunately, it is difficult to obtain polymer with long fibers integrated in the matrix using the compounding processes currently practiced.

Fiber reinforced thermoplastic resins such as polypropylene can be obtained, for example, by drawing processes in which continuous fibers are impregnated with a resin while being drawn Such polypropylene materials are sometimes referred to as "long" fiber reinforced polypropylene resins. These materials typically exhibit superior impact strength, creep characteristics and vibration fatigue characteristics over glass fiber reinforced polypropylene resins obtained by kneading chopped strands and a resin with an extruder or molding machine. The polypropylene material produced by this latter method is sometimes referred to as "short" fiber reinforced polypropylene resin Long fiber reinforced polypropylene resins produced by a drawing method also enables the binding of glass fibers at a very high density, because the glass fibers extend in a single direction in a bound state. Thus, long glass fiber reinforced polypropylene resin is easily produced by a drawing method even if the polypropylene has a glass fiber content ceiling of 75% by weight as is typically common in commercially available product. In contrast, it is difficult to produce a long fiber reinforced polypropylene resin by kneading the resin with an extruder regardless of fiber content.

Melt kneading processes coupled with an ejection molding operation have the advantage of processing speed and flexibility. Additionally, kneading processes coupled with injection molding operations can be used in the direct formation of injection molded parts. Thus, it would be highly desirable to provide a polymer compounding process which would have the advantages of melt kneading operations and could provide high orientation but, at the same time, could produce a material having higher beneficial material attributes associated with processes traditionally considered long fiber formation processes.

It has widely been held that kneading processes are such that the polymer produced is one which will contain reinforcing fibers which have an average length of 0.25 inch or less with few, if any long fibers distributed in the matrix. This absence of long fibers can adversely effect the strength and overall performance of the over the resulting reinforced polymer. Thus, it would be desirable to provide a process for producing a reinforced polymeric material having elevated levels of long levels of long fibers.

It should also be noted that the performance of the reinforced polymer is due, at least in part, to the integration of and adhesion to the reinforcing fiber in the polymeric matrix Use of fiber reinforced polypropylene has been problematic and somewhat limited by the difficulty of obtaining adequate adhesion between the polymer matrix and the inorganic fiber. This problem has been more apparent in melt kneading processes. Many times, the resulting material properties exhibit sub-optimum characteristics due to poor adhesion of the matrix resin to glass fibers. Without being bound to any theory, it is believed that, in polypropylene compounding processes, this is due in part to the non-polarity of polypropylene and the polarity of the glass. When larger amounts of glass fibers are added to polyolefin resins such as polypropylene, the melt viscosity of the polymer is raised making it difficult to use the fiber reinforced resins for molding applications. In addition, the lack of interaction between the polar surfaces of the glass fibers with the non-polar polypropylene results in a very weak filler/polymer interface. To combat this problem manufactures have treated glass fibers, shortly after they are formed, with a composition, often called a sizing, which provides abrasion resistant properties to the fibers, and assists in providing strength and other properties to the reinforced polymers and the products made therefrom These sizing agents help to hold the glass bundles and reduce surface polarity of the glass. Typically, these sizing materials are polymeric materials which provide functionaries which are compatible to both the polymeric matrix and the reinforcing fiber.

Many times the problems of wettability of the reinforcement material is circumvented by employing previously prepared polymeric precursor in subsequent molding processes. Chopped fibers and additives are usually dispersed within a polymer melt via a screw extruder to produce a continuous strand or other shape which is then subsequently cooled or solidified and chopped to produce a molding compound such as a granule or pellet. This process has the disadvantage of producing material which lacks orientation of the plastic.

There are many potential advantages possible in providing long fibers in the finished product. These include but are not limited to improved balance of mechanical properties (e.g. toughness or impact resistance and strength/modulus). High tensile strength, low tensile creep and high tensile fatigue resistance are considered to be the most prominent advantages. Thus it would be desirable to provide a process which would provide a finished molded part having longer fibers and/or greater quantities of long fibers distributed in the finished molded component.

It would also be desirable to provide a process which would cause less breakage of the reinforcement fibers during high shear rate processing. Such a process would translate into greater fiber length retention in the finished molded part.

It would also be desirable to provide a high shear rate process which would result in minimum fiber breakage during processing. It has been found that introduced reinforcement fibers are subject to breakage or curling when subjected to the forces and temperatures necessary to achieve compounding in melt kneading and injection processes. This results in fibers of shorter or non-oriented length. Additionally, it is believed that the low surface area-to-volume ratio of the processes prohibits effective bonding and interaction of the reinforcing fibers in and with the polymer matrix. Rather than laying on a planar orientation, such "corkscrewed" fibers tend to mat and clump which minimizes surface area contact with the polypropylene. A compounding method which can accomplish molding and maintain fibers of longer actual and/or effective length along the oriented polypropylene would be desirable.

SUMMARY OF THE INVENTION

The present invention is directed to a process for producing a molded article made of fiber-reinforced thermoplastic material In the process of the present invention thermoplastic material in its solid state is fed into a suitable processing machine simultaneous with the addition of reinforcing fibers. As used herein, the term "solid" when referring to polypropylene in its solid state is defined as including material which is typically described as granulated, pelletized, powdered and the like. The thermoplastic of choice has a melt flow index above 25 g/10 minutes and is preferably a polyolefin such as polypropylene. The reinforcing fibers are of a length of at least 0.375 inch or greater and are sized with a material which contains at least one polymer from the group which includes polyurethane, polyurea, and isocyanate derivatives thereof The material may have an effective amount of functionalized polyolefin sufficient to promote polyolefin/glass fiber adhesion in applications where such attributes are desired or required.

The polymer and reinforcing materials are subjected to orientational agitation such that the reinforcing fibers are filamentized in an essentially homogeneous dispersion throughout the solid polymeric material.

Once filamentization and dispersion has been achieved, the resulting admixture is introduced into a suitable plasticizing apparatus and is subjected to knead melting operations for an interval sufficient to achieve melting of the polymeric material.

The knead melting occurs at a compression ratio of 2.0:1 to 2.9:1 in an apparatus having a three-section screw having an initial feed zone which comprises between 23.0 to 28.0% of the total screw length, an intermediate transition zone which comprises between 23.0 to 28.0% of the total screw length and a final metering zone which comprises between 9.0 to 26.0% of the total screw length. Material so processed enters a suitable mold device upon exit from the knead melt apparatus; preferably immediately upon such exit. The mold device has a closed cavity mold such as would be employed in injection molding operations.

Parts made from the resulting reinforced polymeric material has a tensile strength at break at least 20,000 psi and preferably has at least one cantilever. Parts made according to the present invention from the resulting polymeric material contain a melt processible thermoplastic material having a melt flow index of at least 25 g/10 minutes and reinforcement fibers having a cumulative length distribution frequency in which at least 5% of the fibers have lengths 10 mm. The reinforcement material has a sizing compound associated therewith which includes at least one polymer from the group including polyurethane, polyurea, and isothiocyanate derivatives thereof The reinforcement material is present in the thermoplastic material in an essentially uniformly dispersed manner in an amount greater than 30% by weight such that individual fibers are oriented in a filamentized manner in the thermoplastic matrix Also disclosed is a cantilevered battery tray mountable to a suitable structural member of an associated automotive vehicle. The cantilevered battery tray preferably has a compartment for receiving an associated ABS module which is integrally formed therewith.

DESCRIPTION OF THE DRAWING

The description herein makes reference to the accompanying drawings wherein like reference numerals refer to like parts throughout the several views, and wherein.

DESCRIPTION OF PREFERRED EMBODIMENT

The thermoplastic material employed in the process and molded article of the present invention may be a thermoplastic material or blend of thermoplastic materials such as are generally suitable for use in molding methods such as injection molding operations. Thermoplastic materials suitable for use in the present invention are typically those referred to as rigid thermoplastics. Examples of such thermoplastic materials include, but are not limited to, thermoplastic resins such as polyamides, polyesters, polyolefins, e.g., polyethylene and polypropylene, polycarbonate, thermoplastic polymer alloys, for example alloys of polyphenylene oxide and polystyrene, and alloys of polycarbonate and polymethylmethacrylate, alloys of polycarbonate and polyester, etc.

The thermoplastic of choice employed in the present invention will have a melt flow rate of at least 25.0 g/10 minute as determined by ASTM Method D1238 taken at 230° C. under a load of 2.16kg. Preferably the melt flow rate is between 33.0g/10 minute and 43g/10 minute taken under the conditions previously enumerated. The thermoplastic material of choice will preferably also have a tensile strength at yield of 4500 psi or greater as determined by ASTM Method D 638.

The preferred thermoplastic for use in the process and molded device of the present invention contains a polyolefin and has the enumerated characteristics. In the most preferred embodiment, polypropylene is advantageously employed along with functionalized polyolefin. Functionalized polyolefins which can be employed in the process of the present invention can be referred to as anhydride-functionalized polyolefins. Typically materials such as maleated polypropylene or acrylated polypropylene are advantageously employed in various combination concentration ratios with the polypropylene in the process of the present invention. It is to be understood that the material of choice may be a polyolefin, polyolefin blend or the like and may contains such additives as would not impede or interfere with the process or the performance of the resulting molded part. The thermoplastic material may contain additives, which can normally be used in processing thermoplastic materials, such as fillers, e.g., talc; as well as materials such as pigments, antistatic agents; and antioxidants. Characteristics of a suitable polypropylene are set forth in Table I.

The polymeric material is a solid mat present in any form which will readily incorporate with suitable reinforcing fibers. Typically pellets or granules are employed having a size suitable for fluidization and optimal conveyance in a device such as a ribbon blender. Pellets having an average diameter between about 0.05 and 0.2 inch can be employed successfully in the present invention.

The reinforcing fibers employed in the process of the present invention and any parts which result therefrom are generally considered to be any materials able to reinforce the associated thermoplastic material. Suitable fibers which may be used as reinforcement include at least one of glass fibers, ceramic fiber, carbon fibers, metallic fibers such as steel fibers, alumina fibers and aramid fibers. In the preferred embodiment, glass fibers are advantageously employed. The present invention also contemplates that additional types of fibers such as, for example, nylon, polyester and polypropylene, may be included in the reinforcement material in amounts which do not compromise the ultimate performance characteristics of the reinforced fiber material of the present invention. These additional materials are not limited those previously enumerated but would be chosen based on the aforementioned attributes as well as compatibility with the polymer matrix and the processing conditions.

Glass fibers which can be employed in accordance with the present invention are fibers of E-glass, S-glass, C-glass, AR-glass, T-glass, D-glass, R-glass or the like. Glass fibers having a random lengths of at least 0.375 inch are suitable for use in the process and molded part of the present invention. In the preferred embodiment, the fibers will have a length distribution which is favors longer fibers such that the minimum general length for reinforcing fibers is at least 0.5 inches. The fibers will typically have width and thickness dimensions which will facilitate filamentization of the fibers with in the solid thermoplastic material during the admixing step. Preferably, the reinforcing fibers are preferably flat planar pieces having a thickness between 0.01 inch and 0.1 inch and a thickness between 0.05 and 0.15 inch.

Reinforcement fibers used in accordance with the present invention must be surface-finished with a finishing agent typically referred to as a sizing. Unsized reinforcement fibers, particularly glass fibers have a hydrophilic nature and therefore exhibit low wettability with thermoplastic resins having a lipophilic nature such as polypropylene. This can result in large surface tension between or surface energy such glass fibers and polypropylene such that the glass fibers cannot easily be dispersed with the polypropylene resin. Resulting masses of glass fibers unimpregnated with the resin during molding operations can cause external appearance defects and tensile strength reduction.

The reinforcing fibers employed in the process and the product of the present invention are coated with an appropriate amount of the defined sizing composition. The sizing material of choice is preferably one which possesses a melting temperature above that of the thermoplastic polymer to be employed as the thermoplastic matrix to which the reinforcement fibers are to be added. The sizing composition will preferably be one having one or more abrasion resistant polymers. In the preferred embodiment, the sizing composition contains at least one of the group which includes polyurethane, polyurea, and isocyanate derivatives thereof.

Preferably the sing composition contains at least one of a polyurethane, and polyurea. By the use of the term polyurethane, it is meant to include reaction products of organic compounds having at least two active hydrogens and di and/or polyisocyanates, wherein the resulting polymer is an film forming polyurethane or polyurea type polymer. By film forming, it is meant that the film of the polyurethane or polyurea alone has a hardness of about 10 shore A to about 75 to 80 shore D with a preferred hardness of shore A 60 to 100 and elongation on the order of 5 to 800 percent. The Shore hardness test is conducted on a Shore durometer by standard procedures, and elongation is measured in accordance with ASTM testing procedure, D412. Preferably, the organic compounds with at least two active hydrogens is a polyol such as a polyolefin polyol polyalkene diol and polyalkane diols, polyester polyol or polyether polyol and most preferably, a polyol which is linear. Examples of polyester-based polyurethane elastomers include those where the polyester is prepared from carboxylic acid such as adipic and the glycol portion can be selected from such materials as ethylene glycol 1,2-propylene glycol, 1,3-butylene glycol and 1,4butylene glycol which alone can be used as chain extenders. Further examples of polyfunctional polyesters which can be used are those based on phthalic anhydride, adipic acid, ethylene glycol, trimethylol propane, and the like. Examples of polyalkene diols include polybutadiene diol, polyisoprene diol. Examples of polyalkylene diols include polybutene diol. It is contemplated that the material may possess no branching of the polyol. It is also contemplated that a slight amount of branching of the polyol can be tolerated but the degree of functional or branching of the polyol should be kept to a minimum since increased branching results in films results in embrittlement The di or polyisocyanates generally used to form the polyurethane or polyurea are selected from aromatic, aliphatic and mixtures thereof isolates and/or isothiocyanates, but the aliphatic isocyanates are preferred. Examples of the polyisocyanates that can be used include the aromatic isocyanate of toluene diisocyanate and the aliphatic isocyanates such as hexamethylene diisocyanate, methylcyclohexylene diisocyanate, dicyclohexyl methane diisocyanate, lysine diisocyanate where the aliphatic group is methyl or ethyl, bis(2-isocyanato ethyl) fumarate, bis(2-isocyanato ethyl) carbonate and dimeryl diisocyanate, where the organic group is essentially a C36 hydrocarbon radical. Another isocyanate that may be used is 4,4'-diphenyl methane diisocyanate. The polyurethane polymer can be made as a curable material by any method known to those skilled in the art, for instance, additional monomers like diisocyanate, polyols or epoxies can be added to the polymer and/or a curable moiety can be introduced into the polymer. Nonexclusive examples of the aforementioned reactive groups or moieties used to make the curable polyurethane elastomer are hydroxyls, epoxies, ureas, amines, amides, and olefinic groups, or reactive methylene or olefinic groups. The polyurethane polymers can be produced by any one-shot or single step method known to those skilled in the art or by the two step chain extension process utilizing linear or lightly branched polyols with the necessary molar portions of the diisocyanate known to those skilled in the art to produce a water dispersible polyurethane. It is to be understood that one or more of the these various film forming polyurethanes can be used m the sizing material. Particularly, two or more of the polyurethanes or polyureas or combination of the two can be blended to achieve a desired hardness and/or elongation and/or a desired degree of abrasion resistance property for the coating on the sized glass fibers.

Nonexclusive examples of the polyurethane polymers that can be used as the film forming polymers in the impregnating coating include those that are internally emulsified. Other types of polyurethane polymers that can be used are those having ionic groups present on the polymer molecule Other types of polyurethane ionomers, e.g. polyurethane polymers having ionic groups present on the polymer, that can be ionically cross linked can be used in the composition of the present invention include polyurethane ionomers. Nonexclusive examples of the ionomers include materials produced by reacting organic diisocyanates having molecular weights of from about 160 to about 300 with tri and/or tetra alkylene polyol such as ethylene glycol, and optionally other aliphatic glycols having molecular weights of from about 62 to about 200 in the presence of glycols containing carboxyl, carboxylate, sulfonic acid and/or sulfonate groups and having a molecular weight of less than around 500. These polyurethane polymers containing the ionic groups or hydrophilic polyether segments are self-emulsifiable and do not need emulsifiers or high shear forces to be emulsified or dispersed, since they are self-dispersing. Also cationic polyurethanes that are formed by quaternizing polyaddition reactions can be used. Combinations of the ionic polyurethanes with polyesters, polyethers, polyacetals, polyisocyanates, low molecular weight glycols and diamines can also be used. The type and amount of the ionic groups present in the ionic polyurethanes are selected so that the polyurethane is not only self-dispersing but that the particle size of the polyurethane is less than around 5 microns.

Typically, glass fiber material will be presized with suitable urethane-containing compositions of the type previously enumerated. This invention is predicated, at least in part, on the unexpected discovery that reinforcement fibers of the type described herein, when sized with a urethane-containing material of the type enumerated, will resist deformation and breakage during compounding and processing. The result injection molded articles exhibit superior strength and durability when incorporated into a polymeric matrix, particularly in a polypropylene matrix.

The amount of reinforcement fibers admixed with the polypropylene will be that amount necessary to provide reinforcement fiber content in the desired weight percentage. Typically molded parts prepared by the process of the present invention will have at least 35% glass content (weight to weight comparison). Preferably the molded part will have a glass content of approximately 40% with the upper amount of glass reinforcement being limited by considerations of materials strength and flexibility. It is anticipated that parts having glass contents as high as 80% can be produced in the process of the present invention depending on end use applications and the like.

Molded parts prepared by the process of the present invention are characterized by a highly oriented or ordered positioning and distribution of reinforcement fibers length relative to fluid flow into the associated mold cavity. It has been found that uncommonly long length fiber reinforcement material can be successfully introduced into a suitable mold cavity thorough an injection molding process. The reenforcement material can be oriented relative to the fluid flow in a manner which provides increased reinforcement and material strength, particularly at, angularities such as beams and cantilevers.

Figure 1:
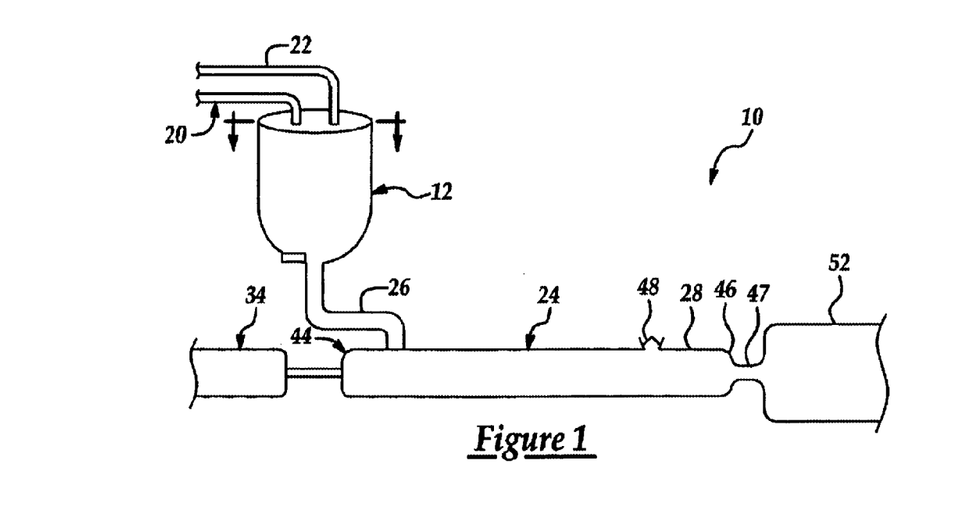
FIG. 1 is a schematic diagram of the compounding apparatus of the current invention.
Figure 2:
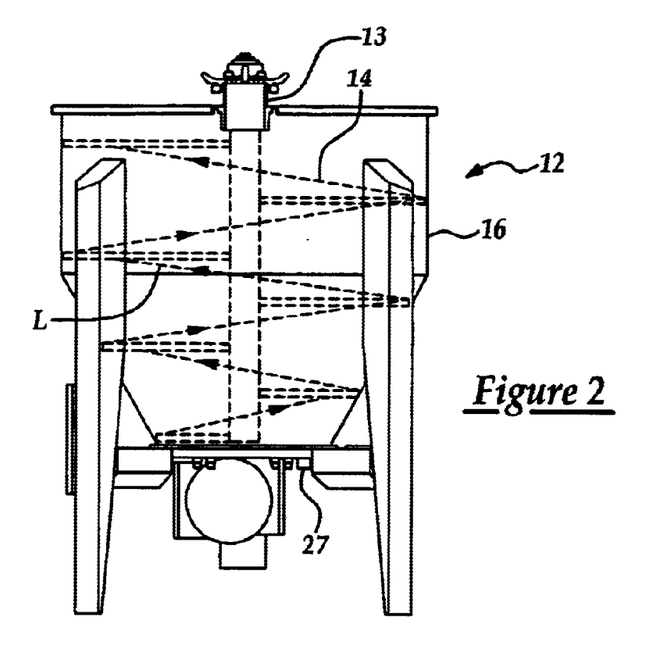
FIG. 2 is a schematic detail diagram of the ribbon blender of the compounding apparatus of FIG. 1.

In the process of the present invention, at the outset uncommonly long length reinforcement fibers are filamentized relative to the solid polymeric material. As used herein the term "filamentizie" is defined as essentially linear or end-to-end orientation of one uncommon length fiber to another with voids between them such that a significant portion of the reinforcement fibers are positioned in an essentially linear position. The term "uncommon length" as used herein is defined as a material having reinforcement fibers whose length distribution is, on average at least 0.5 inch;

In order to process the material according to the present invention a suitable compounding apparatus 10 is employed as depicted in FIG. 1. In order to filamentize the reinforcement fibers relative to the solid glass material the two components are preferably introduced into a low intensity mixing chamber 12 such as a ribbon blender as shown in FIG. 2. The low intensity mixing chamber 12 is one which will permit the ordered fluidization of the introduces solids. By "ordered fluidization" it is meant that the reinforcing fibers are uniformly dispersed in the solid polymeric material in a manner which achieves appreciable orientation of the reenforcement fibers relative to the induced fluid flow.

Preferably, this is achieved the positioning of at least one rotation-inducing central impeller 13 having vertical spiral vane 14 extending outwardly therefrom toward the outer wall 16 of the ribbon mixing chamber. It is believed that the vertical spiral vane 14 serves to comb and orient individual reinforcement fibers relative to the directional flow of the fluid. Without being bound to any theory, it is believed that the shape of the reinforcement fibers facilitates both lift and orientation of the fibers when subjected to the forces in the ribbon mixer.

Solid polymeric material and associated fibers are lifted along the inner wall of the ribbon mixer as generally depicted by the solid line L in FIG. 2. As they are conveyed, the reinforcement fibers are subjected to incremental orientation and slight separation for an interval sufficient to achieve orientation of a sufficient number the reinforcement fibers linear to one another and parallel to fluid directional flow. Upon completion of the fiber orientation phase of mixing, the oriented agitated stream is conveyed downward into a plasticization apparatus.

The solid polymeric material is preferably in a form amenable to fluidization such as pellets or granules. The polymeric material can be introduced into the ribbon blender through a suitable conduit such as auger pipe 20. Associated with the conduit 20 are suitable optional metering devices to control rate and manner of introduction (not shown). Also associated with the polymeric introduction means are suitable drying mechanisms (not shown) to removed moisture from the polymeric material.

The reenforcement fiber can be introduced into the ribbon blender through a suitable conduit such as auger pipe 22.

Associated with the auger pipe 22 are suitable optional metering devices to control rate and manner of introduction (not shown). As with conduit 20, associated with the reinforcement material introduction conduit 22 can be associated with suitable drying mechanisms (not shown) etc as required or desired to effect drying or other material handling requirements.

Without being bound to any theory, it is believed that the agitated polymeric material and the associated agitated oriented reinforcement fiber mechanically interact such that an appreciable number of the reinforcing fibers filamentize in a linear manner which assists in maintaining suitable fiber orientation throughout subsequent processing up to and including introduction into the mold cavity. It was found, quite unexpectedly that thermoplastic moldings having reinforcement fibers dispersed throughout the solid polymeric material in an linear or radial orientation essentially parallel to one another have greatly enhanced strength and performance characteristics. While various attempts have been made to orient fibers in plasticized materials during the compounding process, these have met with limited success. Many have failed to achieve significant levels of fiber orientation with concomitant polymeric orientation. Most have not successfully compounded long or uncommon length fibers. Typically any attempt to comb or orient fibers during a melt kneading process is directed at undoing bending and matting of fibers induced during the compounding action. It has been found, quite unexpectedly, that induction of ordered direction of uncommon length fiber such as filamentization while the respective reinforcement fibers and polymeric material are in the dry state prior to introduction into a plasticization device results in lower fiber distortion, breakage and/or disorientation during plasticization and subsequent introduction into a mold cavity.

In the process of the present invention, the ordered fluidization of the solid polymeric material and associated reinforcement fiber produced while the material is in the dry solid state is maintained as the material enters the suitable plasticizing chamber. As depicted in FIGS. 1 and 2, typically, the agitated material is conveyed upward in the ribbon blender to a central collection zone which is located coaxial to the upward conveyance zone through which the agitated material traverses. In the preferred embodiment, the oriented, agitated material is conveyed downward through a central zone in the ribbon blender and exists the ribbon blender either directly into the plasticizing apparatus or, into suitable means for conveying the agitated oriented material from the exit of the ribbon blender to the compounding apparatus 24. As depicted in FIG. 1, the conveying means is a conduit or pipe 26.

Preferably, the ribbon blender 14 also includes a suitable mechanism 28 for obtaining samples of the agitated solids mixture. Such sampling mechanism is typically located proximate to the point at which the agitated material exists the ribbon blender. The sampling mechanism 28 can be any suitable automated or non-automated mechanism for ascertaining the effectiveness of the fluidization process and/or obtaining physical samples of the material so processed. Thus, the sampling mechanism can include means for visually ascertaining the process. Preferably, the ribbon blender includes a door or portal proximate to the material et point which will permit collection of a sample of suitable volume for analysis and retention.

The collection and exit means from the ribbon blender can be facilitated by any suitable mechanical or architectural elements which will facilitate the smooth and rapid movement of the agitated and filamentized solids product from the ribbon blender. While it is anticipated that various mechanical aids can be employed, in the process as depicted in the present application, the agitated material is collected and dispersed from the ribbon blender by means by any suitable means. It has been found that sufficient mechanical energy has been imparted to the agitated mass by means of the action of the ribbon blender that the ordered filamentized relationship of thermoplastic polymer to reinforcement fiber is not significantly disturbed during the gravity feed process and conveyance into the plasticizing apparatus.

The fluidizing and orienting process proceeds for an interval sufficient to obtain proper orientation of the reinforcement fibers relative to the polymeric material It has been found that at introduced about 800 pounds, a blending interval of between 2 and 10 minutes is sufficient to obtain optimum orientation. Typically, an interval of between 4 and 8 minutes is preferred.

The process of orientation and blending preferably occurs at a temperature below that which impedes further and subsequent processing. It is preferred that the temperature be maintained below the point at which deleterious sintering occurs the melt temperature of the thermoplastic polyolefin material. Preferably, the temperature occurs at or near ambient room temperature, i.e. between about 68° and 72° F. with no additional heat being supplied to the ribbon blender vessel. It is to be understood that material introduced into the ribbon blender may retain shear heat from the blending process. However such retained heat is to be tolerated in the fluidization and orientation process occurring in the ribbon blender. It has been that the material so processed in the ribbon blender 14 of the present invention retain orientation even after completion of processing in the ribbon blender. This permits flexibility in processing and product flow. It is conceivable that material produced in the ribbon blender can be stockpiled and further processed as desired or required.

It is also to be understood that the act of fluidization and blending can generate discrete temperature elevations in the blended material. However, any temperature elevation which may occur due to either frictional interaction and/or introduction of retained heat is below that at which the thermoplastic material experiences significant, if any, melting events. Thus, in the preferred embodiment, the material which exits the ribbon blender is a agitated mixture of thermoplastic material in a pelletized or granulated form with discrete lengths of reinforcement fiber dispersed essentially uniformly therethrough in a filamentized arrangement in which the reinforcement fibers are oriented in essentially parallel end to end relationship to one another and increased spacing between the fibers resulting in the increased presence of void spaces.

Figure 3:
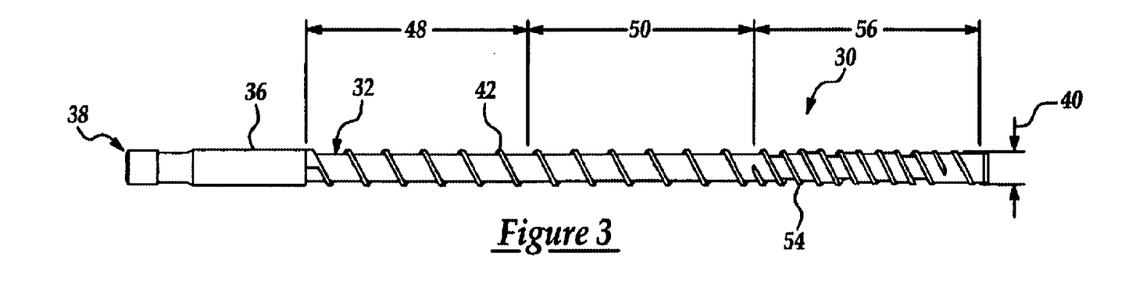
FIG. 3 is a detail drawing of the processing screw of the plasticizing device employed in the processing device of FIG. 1.

The compounding device 24 to which the prepared material is conveyed can be generally described as a continuous plasticizing and compounding vessel. The plasticizing vessel employed in the present invention includes at least one screw capable of accomplishing knead melt operations. The apparatus is one which is capable of continuous production of fiber reinforced thermoplastics. The device preferably includes at least one three stage zone extruder screw an example of which is depicted in FIG. 3. The plasticizing device is one which has a feed zone, a transition zone and a metering zone. These zones may be of sufficient length to operate on the agitated material introduced into the plasticizing apparatus.

In the preferred embodiment, the device will employ a screw having a length to diameter ratio of 18 to 32 inch with a length to diameter ratio of 19 to 20 inch being preferred.

It can be appreciated that in typical compounding and plasticizing operations, screws having a length to diameter ratio in excess of 25 are employed. It, has been believed that such protracted processing intervals as would be incurred in devices having elevated length to diameter ratios were necessary to obtain proper dispersion of the reenforcement fibers in the polymeric matrix. However it has been found quite unexpectedly that shorted process intervals as would result from the use of devices having screws with shorter length to diameter ratios can be successfully employed in the process of the present invention. Without being bound to any theory, it is believed that this is due, at least in part to the orientation and dispersion of fibers which occurs prior to introduction of the material into the plasticization device.

In the process and device of the present invention, the plasticizer/extruder may be of standard construction with the exception of the screw configuration. In general the plasticizer includes a barrel portion 28 defining a central cavity surrounding the screw 30. In the process and device of the present invention, the screw will have a configuration capable of producing an initial processing region of low compression. As used herein "low compression" is defined as a compression ratio between 2.0:1 and 2.9:1.

The screw 30 comprises a central shaft 32 having means for engaging a source 34 of rotational power such as spline 36 located at a first end 38. The screw has a second distal end 40 which terminated at or proximate to the exit point for processed polymeric material. The screw 30 also has at least one series of screw flights 42 extending radially outward from the surface of the central shaft 32. As depicted in FIG. 3, the at least one flight extends spirally along the central shaft 32 for a major portion of its length.

The extruder barrel 28 in which the screw 32 is positioned and rotates is provided proximate to its forward end 44 with suitable means for receiving the agitated stream of oriented reinforcement fibers dispersed in the solid polymeric material. The distal end 46 with a suitable nozzle or other exit orifice (not shown). The nozzle or exit orifice will have at least one suitably configured exit orifice through which the material being processed can ultimately be extruded. Preferably the exit orifice is configured with a narrow slot nozzle to mate to the mold.

Extrusion of processed material preferably occurs directly into a suitable device (52) having a closed mold cavity while the material is still in its moldable state. Such closed mold devices are typically employed in injection mold operations. Additionally, the compounding device 24 can include suitable vents such as vent 48 and the like to remove volatiles as well as devices to regulate internal atmosphere (not shown) and the-like as desired or required.

In the process of the present invention, the extruder screw 32 is configured so device 24 has a compression ratio of between 2.0:1 and 2.9:1. It can be appreciated that this compression ratio is significantly lower than standard compression ratios typically found in various conventional plasticizing apparatuses which typically runs between 3.0.1 or higher. Without being bound to any theory, it is believed that the lower compression ratio promotes initial melting of the thermoplastic material in a manner which maintains the filamentized or orientation of the reinforcement fibers relative to the melting polymeric material. Heretofore it was believed that higher compression ratios were required to achieve uniform melt and adequate dispersion of reinforcement fibers in the melting polymeric material.

It has been found that the lower compression ratios can achieve the melt and dispersion required or desired when employed in the process of the present invention. Furthermore it is believed that the lower compression ratios may contribute to the production of polymeric material having at least some of the unique attributes of the material produced by the method of the present invention. Without being bound to any theory, it is believed that lower compression permits equalization of the reinforcement fibers in the melting and changing polymeric matrix. It is believed that equilibration of the two materials with respect to one another assists in maintaining the reinforcement fibers in an elongated oriented position relative to the polymeric matrix.

As shown in FIG. 3, the screw 30 preferably has an essentially uniform diameter through the feed zone 48 and the gradual tapered transition zone 50. In the preferred embodiment, the flight depth in the feed section 48 is uniform and the flight depth in the transition zone 50 exhibits a variable decreasing geometry. In a screw having a diameter between 4.0 and 5.0 inches, the flight depth will preferably be between 0.2 and 0.8 inches with a flight depth of 0.5 to 0.65 being preferred. The flight configuration employed is preferably configured as a spiral auger having a pitch between 3.5 and 6.0 with a pitch between 4.0 and 5.0 being preferred.

The third and final or metering zone 56 of the processing device 24 achieves both mixing and metering into an associated closed mold device 52. As shown in FIG. 3, the screw 24 includes an additional flight 54 configured to provide regions of high and low shear. This provides levels of elevated mixing intensity. The action of the spiral auger causes material to continue to move through the plasticizer with additional melt kneading and blending The intraflight 54 is preferably configured and positioned to achieve thee desired regions of high and low shear.

In the screw configuration of the present invention, the feed, transition and metering sections of the screw are present in specific ratios. The feed section is of a length which accomplishes conveyance of the introduced material into the transition stage. The feed section includes suitable heat sources such as heater bands (not shown). Due to the low constant compression ratio, lithe if any melting occurs in this section. The length of the feed section will comprise between 20.0 and 30.0% of the total screw length, with a length of 23.0% to 28.0% being preferred. The transition section is of a length which will accomplish melting and suitable compression elevation. The transition section also includes a suitable source of added heat such as heater bands. The temperature of the transition section is above that of the feed section. The length of the transition section will comprise between 40 and 70% of the total screw length, with a range between 47 and 67% being preferred. The metering zone has a length sufficient to accomplish mixing and proper alignment of the fibers for proper entry into the closed cavity mold. The metering section has a length which comprises between 9.0 and 26% of the total screw length. Total screw length is the length of the processing portion of the screw exclusive of the splint.

The plasticizing apparatus of the present invention may include suitable means for providing heating to the plasticizing chamber. Such heating can include, but is not limited to, heating caused by the action of the mixing screw 30 and/or the chamber itself. It is also within the purview of this invention that external heat be employed at locations which facilitate melting and processing.

Thus, the melt kneading event which proceeds in the plasticizing chamber is accompanied by temperature elevations. The temperature achieved in the plasticizing chamber is one which will permit melting of the introduced thermoplastic pellets but will be below the temperature which would cause appreciable thermoplastic decomposition. "Appreciable decomposition" is defined herein as oxidation, chain scission or other chemical breakdown which in an amount or at a level which would impair the end function of the reinforced material produced by the process of the present invention. Generally, the maximum melt temperature achieved in the plasticizing chamber in the process of the present invention will be between 450° F. and 650° F. It is to be understood that the melt temperature as defined therein is the temperature at exit from the nozzle.

In the process and apparatus of the present invention, it is believed that the material experiences a temperature elevation gradient as it is conveyed through the plasticizing apparatus. Thus, the temperature maximums are experienced at or near, the exit point from the apparatus. Without being bound to any theory, it is believed that the temperature gradient permits the optimum thermoplastic viscosity for plasticization of urethane/polyurea-containing sizing contained on the reinforcement, fibers. In this manner, the oriented reinforcement fibers are flexibly conveyed in a filamentized fashion in the mixture through the initial melting stages but are subject to a brief interval of temperature sufficient to melt the urethane.

Without being bound to any theory, it is believed that differences in the melting temperature of the urethane and the lower melting polyolefin matrix can provide a reinforcement mechanism as the filamentized fibers are processed through, the melt kneading operation. The reinforcement phenomenon permits the reinforcement fibers to retain their initial linear shape and serves to prevent the fibers from curling or heat deforming. Additionally, it is theorized that the urethane sizing, in interacting with the polymeric matrix, provides some lubricity which prevents the fibers from distorting as they contact one another and the process surfaces in the plasticizing apparatus. Thus, it is believed that the urethane based sizing material present on the reinforcement fibers acts as a processing aid during initial stages of the plasticizing operation and, when activated at elevated temperature and compression, serve as a bonding aid during expulsion and subsequent molding operations.

Without being bound to any theory, it is believed that the urethane sizing material present on the filamentized reinforcement fibers experiences delayed melting as the temperature progressively rises in the melt knead chamber. It is theorized that the delayed melting of the urethane serves to encapsulate and stiffen the enclosed fibers during initial processing phases while providing a degree of lubricity which facilitates the movement of the melting polypropylene polymer relative thereto.

It is also believed that delayed melting may serve to activate available reactive sites in the urethane polymer matrix as the elevated temperature is achieved. Thus, upon exit from the extrusion device and entry into the associated mold, the reinforcement fibers are in an essentially parallel, planer state dispersed uniformly through the propylene polymer matrix. Without being bound to any theory, it is believed that the newly rendered reactive sites in the urethane matrix associated are capable of at least limited reaction with the surrounding polymer matrix as well as point-to-point bonding between urethane associated with other reinforcement fibers. Such actions will occur most apparently upon cooling and solidification of the processed material.

As indicated previously upon completion of plasticization and knead meting, once the material has been processed and compressed, the material is expelled from the barrels region of the plasticizer 24 and introduced into a dosed cavity mold device 54. The mold device 54 will be any one capable of forming the desired end use part and thus will have suitable negative indentations etc to form the geometric surfaces required or desires in the finished part. The closed cavity mold is one which would typically be familiar to those skilled in the art of injection molding. As such the closed cavity mold can be prepared with materials such as mold releases agents and the like to facilitate the molding process. However while these agents may be desirable and/or required in the molding technology, they are generally considered tangential to the disclosure of the present invention.

The closed cavity mold device employed may have two or more mating die pieces as would be desired or required. In the process of the present invention, the melted polymeric material with the reinforcement fibers contained therein in a dispersed and oriented relationship to fluid flow, is introduced into the closed mold cavity in an manner which directs and the flowing material in an efficient and effective manner.

Typically the closed mold cavity will have a geometry which includes at least two primary planes at angular orientation to one another. The mold cavity will have at least one entry point for the reinforced polymeric material preferably at a location which helps maintain a sufficient degree of the filamentized orientation, either radial or planar, of the reinforcing fibers through critical geometric regions in the finished part. Thus with reference to the battery mounting bracket 100 shown in FIGS. 4–6, a mold cavity entry point is preferably located at a position essentially central to the rear wall 102 and angular to the bottom support surface 104. The entry point can be discerned in the battery mounting bracket 100 in FIGS. 4–6 as mold entry vestige 106 that is trimmed (shown in phantom).

Without being bound to any theory, it is believed that the reinforcement fibers enter the closed mold cavity encapsulated or encased in the surrounding polymeric matrix material in the oriented filamentized manner described previously. Upon entry through a suitable entry port, the fluid flow is diverted in an ordered fashion by internal geometries of the mold cavity and flow characteristics of the introduced material. Thus the material flows through angularities and ribs in a manner which orients a sufficient number of uncommon length reinforcement fibers in a manner which maximizes reinforcement strength. Typically, this orientation is essentially perpendicular or radial to and across the angle formed in the molded part. Perpendicular orientation typically occurs in end-gated closed cavity molding processes, while radial orientation typically occurs in center-gated closed cavity molding processes. It is believed that the oriented fibers conform to flow pattern induced in the cantilever mold. Therefore, the fibers located at the contiguous junction of cantilever to mold wall are oriented in a linear fashion which conforms to the cantilever geometry. Because the fibers have a significant linear orientation, it is theorized that the load experienced by the cantilevered part floor is effectively transferred through the glass fibers into the mounting wall and associated engine compartment frame structure to which the bracket is mounted.

It is theorized that the solidification phenomenon which occurs upon entry in the closed mold cavity is a gradual or graded one. At least limited solidification of the urethane-based polymer associated with each reinforcement fiber occurs at a temperature slightly above the solidification temperature for the polyolefin polymer matrix. In this way, a quasi-grid of reinforcement fibers is formed after entry of material into the closed cavity mold which achieves at least a degree of quasi-rigidity at a point during which the surrounding polymer matrix retains a greater degree or fluidity. It is believed that this differential in fluidity, though slight is sufficient to permit the polymeric matrix to completely surround, encapsulate and or interact with the individual reinforcement fibers so as to form an integral structure upon complete cooling.

It has been unexpectedly discovered that reinforcement fibers, such as glass, having an uncommon length of 0.5 inches or greater, when treated with polyurethane-based s and subjected to the process of the present invention, will provide a finished molded product having a significant quantity of oriented fibers of an atypical distribution length including 0.5 inches or greater. Without being bound to any theory, it is believed that the ability to process a fiber-reinforced thermoplastic having large numbers of uncommon length fibers in a melt knead process under high shear rate molding conditions is unprecedented.

The resulting parts have an increase in tensile strength over parts produced by more conventional methods. The increase in tensile strength can equate to greater design flexibility in molded parts prepared from fiber reinforced polymeric materials.

Figure 4:
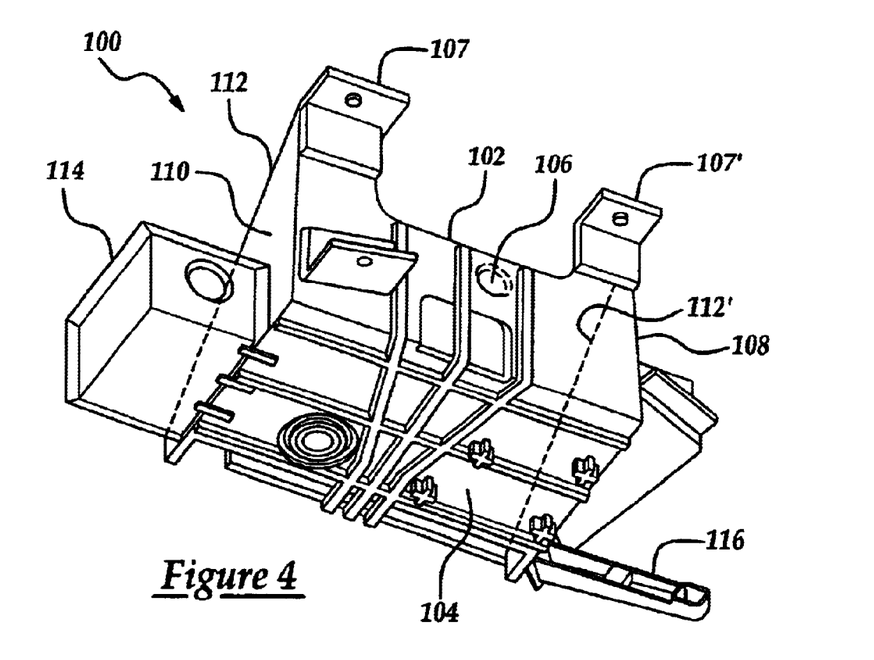
FIG. 4 is a front perspective view of a cantilevered battery mounting tray formed by the process of the present invention.
Figure 5:
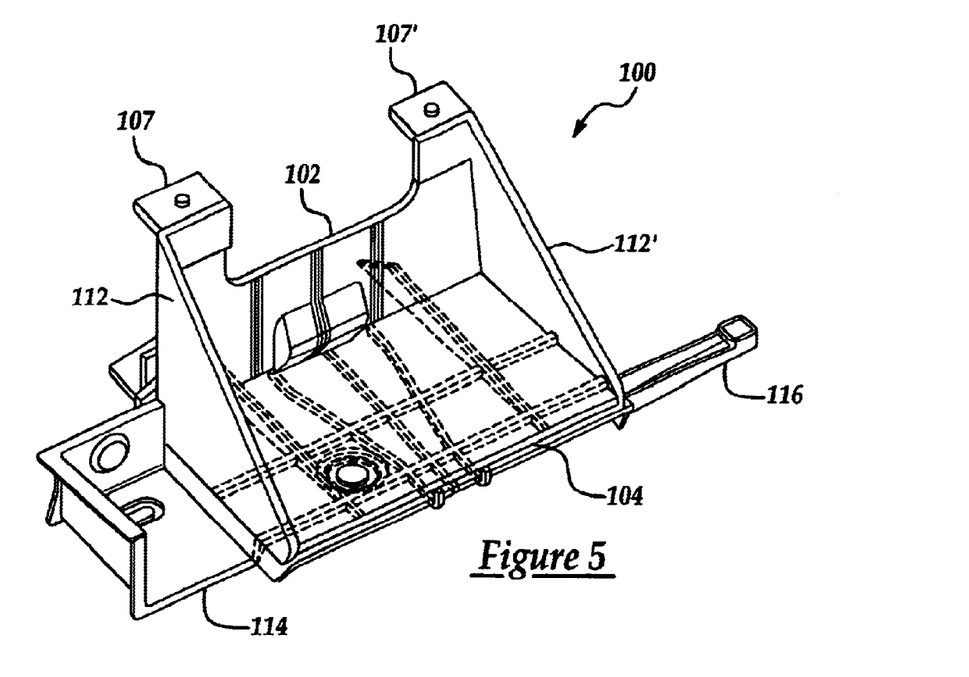
FIG. 5 is a front perspective taken from the opposite face as shown in FIG. 4.
Figure 6:
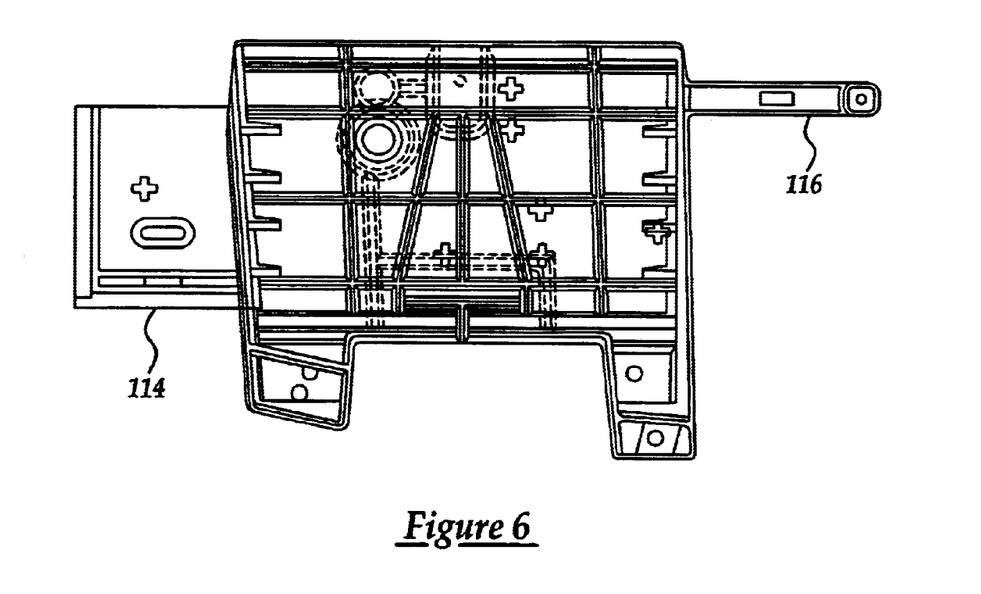
FIG. 6 is a bottom view of the battery bracket of FIG. 4.

The process of the present invention can be advantageously employed to produce cantilevered bracket mountings such as the battery mounting bracket 100 device shown in FIGS. 4–6. The device shown therein can successfully support an automotive battery or battery in conjunction with other under-hood component of 10 to 120 pounds. Heretofore, battery mountings had to include a pedestal appurtenance which to transfer the weight of the battery downward through the pedestal to a suitable mounting member located below the battery. As can be readily appreciated, such requirements severely limited the space and flexibility for positioning the battery in the engine compartment and percent the ability to hang other component from the lower surface thereof The present invention includes a wall mounted battery bracket 100 composed of a fiber reinforced polyolefin such as polypropylene containing at least 30% glass reinforcement fibers having an uncommon length of 0.5 inch or greater dispersed in the polypropylene matrix in an essentially uniform oriented manner. The reinforcement fibers are elongated and have a urethane-containing sizing material associated therewith. The battery mounting tray 100 has a vertically orientable mounting member which comprises the rear wall 102 which is adapted to be attachable positionable planer to a side wall of the associated automotive vehicle (not shown) by means of suitable mounting brackets such as brackets 107, 107'. The vertically orientable mounting member facilitates a permanent or semi-permanent attachment to the fire wall or other structural member located in the engine compartment.

The battery mounting tray 100 includes a mounting floor or lower panel 104 extending essentially perpendicularly outward from the mounting wall 102. As depicted in FIGS. 4–6, a pair of spaced opposed side walls 108, 110 are contiguously joined and perpendicularly oriented to the mounting wall 102 and the lower floor 104 and extend therebetween. In the preferred embodiment, the opposed side walls 108, 110 have an essentially triangular configuration with the respective legs contiguously connected to the respective edge of the associated mounting wall 102 or lower floor 104. The third edge of the respective wall extend between the outermost end of the respective mounting wall and lower floor member and may have a reinforced outer edge 112, 112' extending thereon. The outer edge 112, 112' may have a suitable outer lip (not shown) to further reinforce the outer edge 112, 112' as desired or required. The mounting wall 102, floor member 104 and side wall 112, 112' cooperatively form an inner space into which an associated battery can be removably inserted The floor member 104 and mounting wall 102 can have suitable fastening members and through bores to facilitate removable positioning of the battery relative to the bracket and to accommodate positioning and location of any cables wires and the like.

The battery support bracket 100 may also include at least separate auxiliary component positioned exterior of one or the other side wall members 112, 112' and contiguously mounted thereto. As shown in FIGS. 4–6, the battery mounting bracket 100 is configured with an exterior auxiliary mounting bracket 114 contiguously mounted to and extending from side wall 110. The exterior auxiliary mounting bracket 114 as shown in FIGS. 4–6 is adapted to provide a suitable mount location for the associated brake system (ABS) of the vehicle. As such, it can have a configuration suitable to that end. It has been found that the cantilevered configuration of the battery support tray 100 provides vibrational damping for the vibration emanating from the ABS during operation. The damping effect is further magnified by the heavy weight of the associated battery such that a significant portion of the generated vibration is not transmitted through to the automobile frame to the break pedal.

The battery support bracket 100 as depicted in FIGS. 4–6 also includes a suitable mounting extension 116 to house various wiring component. The mounting extension extends outward from the opposed side wall 112'.

The main body of the mounting bracket 100 of the present invention can include suitable reinforcement ridges and mounting aids to further reinforce the device and facilitate effective mounting relative to the associated automotive vehicle In general these elements will be positioned and configured based upon considerations specific to the individual design and specifications associated therewith.

As indicated previously, the bracket device of the present invention will be composed of a polymeric material consisting of at least 30% reinforcement fiber uniformly disbursed in a polyolefin matrix, with amounts of reinforcement fiber greater than at least 40% being preferred. The polyolefin matrix is preferably composed of a polypropylene having a melt flow index of at least 35 g/10 min. and a tensile at yield of at least 5000 psi. The reinforcement fibers employed in the bracket of the present invention have an average length of at least 0.5 inches and have a urethane sizing associated therewith.

It has been found that molded parts composed of the material so enumerated can have a tensile strength at break in excess of 20,000 psi with tensile strength in excess of 25,000 psi being obtainable. The parts so made are also resistant to degradative materials present in the automotive device such as battery acid and the like. In ascertaining tensile strength at break for purposes of the present invention, the methodology outlined in ASTM D638 is followed using a type IV test specimen composed of the material of the present invention.

To further illustrate the composition, the following examples are given. It is to be understood that these examples are provided for illustrative purposes and are not to be construed as limiting the scope of the present invention.

EXAMPLES I–IV

Six separate runs were conducted in which polymeric material was prepared according to the process of the present invention using standard grade polypropylene pellets commercially available from BP Amoco and uncommon length urethane-sized glass fibers commercially available from Johns Manville Corporation having an average length of at least 0.5 inch the materials were introduced in to ribbon blender having a mixing velocity of 60 rpm and a pass through capacity of 800 pounds at a ratio calculated to yield a glass reinforcement level of 40% by weight. The materials were dry mixed for an effective interval of six minutes.

The admixed material was transferred in a continuous manner to a plasticizing apparatus having the screw design depicted in FIG. 3. The screw in question had a length to diameter ratio of 20 and was configured to be capable of achieving a compression ratio of 2.25:1.

The resultant plasticized material was introduced into a closed cavity mold to produce batter mounting brackets of the configuration shown in FIGS. 4–6. Five battery brackets from each were randomly selected and tested according to testing procedures standardly accepted in the automotive industry. The results of each test and each run were compiled and are set forth in Table II along with standard 3-Sigma deviations.

It can be appreciated from the accumulated that the polymeric material of the present invention formulated by the process of the present invention demonstrates superior strength and durability.

TABLE I

Characteristics of Suitable Polyolefin

| Typical Resin Properties | Value | ASTM Method |
|---|---|---|
| melt flow index (g/10 min) | 38.0+ | D1238 |
| density (g/cm$^2$) | 0.904 | D1505 |
| tensile strength @ yield (psi) | 5000+ | D638 |
| flexural modulus (10$^3$ psi) | 210 | D790A |
| deflection temperature @ 66 psi, ° F. (° C.) | 210(99) | D848 |
| Izod impact strength, ⅛" notched, (ft-lb/in) | 0.50 | D256 |
| Rockwell hardness, R scale | 100 | D785 |

What is claimed is:

1. A process for producing a molded article made of fiber-reinforced thermoplastic material, the process comprising the steps of:
    knead melting a composition comprising a thermoplastic material in its solid state and reinforcing fibers, wherein the thermoplastic material of the composition has a melt flow index of at least 25 g/10 minutes according to ASTM D1238, and wherein the reinforcing fibers of the composition have an average length greater than 0.375 inch and are sized with a material which contains at least one polymer selected from the group consisting of polyurethane, polyurea, and isocyanate derivatives polyurethane, and isocyanate derivatives of polyurea, wherein the reinforcing fibers are filamentized in an essentially homogenous dispersion throughout the solid polymeric material;
    transferring the knead melted material into a suitable closed cavity mold device; and
    upon solidification, removing a finished articles from the mold device.
2. The process of claim 1 wherein the thermoplastic material is a polyolefin.
3. The process of claim 2 wherein the thermoplastic material is a polypropylene.
4. The process of claim 2 wherein the composition further comprises a functionalized polyolefin.
5. The process of claim 1 wherein the reinforcing fibers are present in an amount greater than 30% by weight.
6. The process of claim 5 wherein the reinforcing fibers are present in an amount between 35% and 55% by weight.
7. The process of claim 6 wherein the reinforcing fibers are at least one from the following group: glass fibers, carbon fibers, alumina fibers, metallic fibers, ceramic fibers and aramid fibers.
8. The process of claim 7 wherein the reinforcing fibers further include at least one of the following fibers co-mingled therewith: nylon, polyester and polypropylene.
9. The process of claim 8 wherein the reinforcing fibers are glass and are present as discrete lengths of at least approximately 0.5 inch.
10. The process of claim 8 wherein the sizing compound contains at least one of the group which includes polyurethane, polyurea, and isothiocyanate derivatives thereof.
11. The process of claim 1 wherein the knead melting step occurs in an a device capable of achieving a compression ratio between 2.0:1 and 2.9:1.

TABLE II

Plastic Statistical Property Data

| Property | Standard Limits | n | Mean −3σ | Mean | Mean +3σ |
|---|---|---|---|---|---|
| Tensile @ Break | | 30 | 20,333 psi | 22,511 psi | 24,688 psi |
| Specific Gravity | | 30 | 1.137 | 1.153 | 1.169 |
| Izod Impact | | 30 | 3.4 ft-lb/in | 4.8 ft-lb/in | 6.1 ft-lb/in |
| Deflection Temperature Under Load | | 30 | 156.2° C. | 158.2° C. | 160.3° C. |
| Instrument Impact | Maximum Load | 30 | 696 N | 839 N | 982 N |
| | Total Energy | 30 | 7.0 N-m | 11.2 N-m | 15.4 N-m |
| Filler Content | | 30 | 36.6% (wt) | 40.0% (wt) | 43.4% (wt) |
| Flexural Modulus | | 30 | 1,087,000 psi | 1,277,000 psi | 1,468,000 psi |

12. The process of claim 11 wherein the device contains a three-section screw having a length, the three-section screw having an initial feed zone, an intermediate transition zone and a final metering zone, wherein the feed section comprises between 23.0 to 28.0% of the total screw length, the transition section comprises between 47.0 to 67.0% of the total screw length, and the metering section comprises between 9.0 to 26.0% of the total screw length.

13. The process of claim 12 wherein the knead melting process at a temperature sufficient to melt the thermoplastic polymer into a mass sufficient to surround and encase the oriented reinforcement fibers present in the initial admixture.

14. The process of claim 13 wherein the introduced material experiences a gradual temperature increase up to and through the temperature sufficient to melt the thermoplastic material.

15. The process of claim 14 wherein the maximum temperature achieved is between 450° F. and 650° F.

16. The process of claim 15 wherein the maximum temperature achieved is sufficient to initiate melting of the sizing material associated with the reinforcement fibers.

17. The process of claim 16 wherein the finished article is a molded part composed of at least one thermoplastic polymer containing a quantity of reinforcement fibers dispersed in an essentially uniform manner therein, the reinforcement fibers oriented in a filamentized relationship to one another and at least a portion of the fibers having an average length of at least 0.5 inch.

18. The process of claim 17 wherein the molded part contains a thermoplastic polyolefin and wherein the reinforcement fibers are at least one from the following group including glass fibers, carbon fibers, alumina fibers, metallic fibers, ceramic fibers and aramid fibers.

19. The process of claim 17 wherein the reinforcement fibers are glass fibers present in an amount greater than 30% by weight.

20. A process for producing a molded article made of fiber-reinforced thermoplastic material, the process comprising the steps of:
  admixing thermoplastic material in its solid state with reinforcing fibers, wherein the thermoplastic material has a melt flow index of at least 25 g/10 minutes according to ASTM D1238, and consists of at least one of the group which includes polyamides, polyesters, polyolefins, polycarbonates, thermoplastic polymer alloys, and wherein the reinforcing fiber has an average length of at least 0.375 inch and are sized with a material which contains at least one polymer selected from the group consisting of polyurethane, polyurea, isocyanate derivatives of polyurethane and isocyanate derivatives polyurea, wherein the reinforcing fibers are filamentized in an essentially homogenous dispersion throughout the solid polymeric material;
  knead melting the admixed thermoplastic material and oriented reinforcing fibers for an interval sufficient to achieve melting of the thermoplastic material, wherein the knead melting step occurs in a device capable of achieving a compression ratio between 2.0:1 and 2.9:1;
  transferring the knead melted material into a suitable closed cavity mold device; and
  upon solidification, removing a finished article from the mold device.

21. The process of claim 20 wherein the device contains a three-section screw having a length, the three-section screw having an initial feed zone, an intermediate transition zone and a final metering zone, wherein the feed section comprises between 23.0 to 28.0% of the total screw length, the transition section comprises between 47.0 to 67.0% of the total screw length, and the metering section comprises between 9.0 to 26.0% of the total screw length.

22. The process of claim 21 wherein the thermoplastic material is a polyolefin.

23. The process of claim 22 wherein the thermoplastic material is a polypropylene.

24. The process of claim 22 wherein the thermoplastic material includes a functionalized polypropylene polyolefin.

25. The process of claim 24 wherein the reinforcing fibers are present in an amount greater than 30% by weight.

26. The process of claim 25 wherein the reinforcing fibers are present in an amount between 35% and 55% by weight.

27. The process of claim 26 wherein the reinforcing fibers are glass and are present as discrete lengths of at least approximately 0.5 inch.

28. The process of claim 25 wherein the sizing compound contains at least one from the group which includes polyurethane, polyurea, and isothiocyanate derivatives.

29. The process of claim 20 wherein the admixing step occurs in a vertical ribbon blender.

30. The process of claim 20 wherein the admixing step comprises:
  introducing the thermoplastic resin and the reinforcing fiber into a premixing vessel, wherein the premixing vessel has an outer wall and at least one rotational mixing element and at least one directional orientation device extending inward from the outer wall in a manner sufficient to orient and direct movement of the introduced thermoplastic resin and reinforcing fiber within the vessel interior, and wherein the thermoplastic resin and reinforcing resin both are introduced into the premixing vessel in a solid and essentially dry state and maintained in said state during residence in the premixing vessel;
  fluidizing the material introduced into the mixing vessel by subjecting the introduced thermoplastic resin and reinforcing fiber to a rotational force induced by the at least one rotational mixing element, wherein the rotational force is sufficient to subject the introduced material to centrifugal force in a vertical axis and bring the introduced material into contact with the at least one directional orientation device; and
  maintaining the agitated material in contact with the rotational mixing element and at least one directional orientation device for an interval sufficient to achieve dispersion of the reinforcing fiber throughout the solid polymeric material and to filamentize the reinforcing fibers in an orientation essentially parallel to flow induced in the premixing vessel.

31. The process of claim 30 wherein the admixing step further comprises:
  after the premixing step has been completed, conveying the admixed material from the premixing vessel to a knead melting apparatus, the conveyance proceeding in a manner which preserves the reinforcement fibers in an oriented and dispersed fashion relative to the polymeric material.

32. The process of claim 31 wherein the conveyance of the admixed material into the knead melting apparatus occurs immediately upon completion of the. admixing step.

33. A process for producing a molded article made of fiber-reinforced thermoplastic material, the process comprising the steps of:
  admixing thermoplastic material in its solid pelletized state with glass reinforcing fibers, wherein the thermoplastic material contains a major portion of polypropylene and a minor portion of functionalized polypropylene, the thermoplastic material having a melt flow index of at least 25 g/10 minutes according to ASTM D1238, and wherein the glass reinforcing fibers have an average length greater than 0.375 inch and are present in an amount greater than 30% by weight, the glass reinforcing fibers are sized with a material which contains at least one compound selected from the group consisting of polyurethane, polyurea, isocyanate derivatives of polyurethane, and isocyanate derivatives of polyurea, and wherein the glass reinforcing fibers and the thermoplastic material are subjected to centrifugal orientational agitation in the vertical axis such that the glass reinforcing fibers are filamentized in an essentially homogenous dispersion throughout the solid pelletized polymeric material;

knead melting he admixed thermoplastic material and oriented reinforcing fibers for an interval sufficient to achieve melting of the thermoplastic material, wherein the knead melting step occurs in a device capable of achieving a compression ratio between 2.0:1 and 2.9:1;

transferring the knead melted admixture into a suitable mold device; and removing a finished article from the mold device.

34. The process of claim 33 wherein the reinforcing fibers are present in an amount between 35% and 55% by weight.

35. The process of claim 34 wherein the knead melting steps occurs in a multi-zone extrusion device having a compression ratio between 2.0:1 and 2.5:1 and a three-section screw having a length, the three-section screw having an initial feed zone, an intermediate transition zone and final metering zone, wherein the feed zone comprises between 23.0 to 28.0% of the total screw length, the transition zone comprises between 47.0 to 67.0% of the total screw length, and the metering zone comprises between 9.0 to 26.0% of the total screw length.

36. An article composed of an injection moldable polymeric material, the injection moldable polymeric material comprising:

a melt processible thermoplastic material having a melt flow index of at least 25 g/10 minutes according to ASTM D1238;

reinforcement fibers having a cumulative length distribution frequency is at least 5% of fibers having lengths 10 mm, the reinforcement material having a sizing compound associated therewith, the sizing compound including at least one polymer from the group consisting of polyurethane, polyurea, and isothiocyanate derivatives thereof, the reinforcing material is present in an essentially uniformly dispersed manner in which individual fibers in a filamentized manner in an amount greater than 30% by weight; and wherein the article has at least one cantilever and a tensile strength at break at least 20,000 psi.

37. The article of claim 36 wherein the cantilevered article demonstrates low tensile creep and high tensile fatigue resistance has a tensile strength at yield of greater than 20,000 psi.

38. The article of claim 37 wherein the reinforcement fiber is at least one from the group consisting of glass fibers, carbon fibers, ceramic fibers, metallic fibers, alumina fibers and aramid fibers and the sizing contains thermoplastic polyurethane.

39. The article of claim 38 wherein the reinforcing fibers are glass and are present in 35% and 55% by weight.

40. The article of claim 38 wherein the reinforcement fiber is glass and the article is a battery tray.

41. The article of claim 40 having a mounting bracket adapted to hold an ABS module therein, said bracket being contiguously attached to the battery tray.

* * * * *